S. H. STEPP.
Saw-Gummer.
No. 213,304. Patented Mar. 18, 1879.
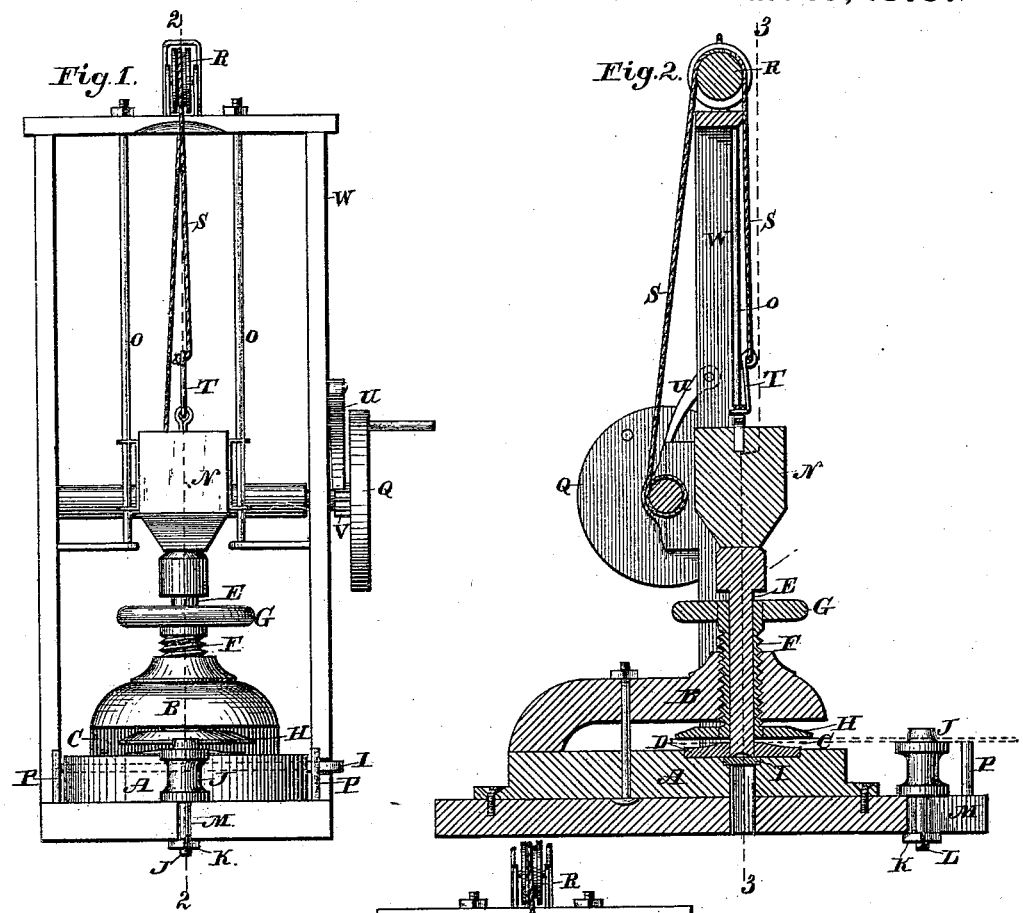
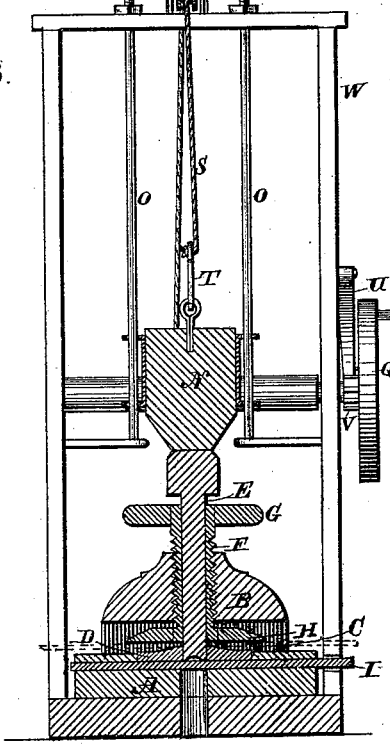
Attest.
J. Henry Kaiser.
Walter Allen
Inventor.
Silas H. Stepp
By Knight Bros
Attys.

UNITED STATES PATENT OFFICE.

SILAS H. STEPP, OF JOHNSON CITY, TENNESSEE.

IMPROVEMENT IN SAW-GUMMERS.

Specification forming part of Letters Patent No. 213,304, dated March 18, 1879; application filed September 2, 1878.

*To all whom it may concern:*

Be it known that I, SILAS H. STEPP, of Johnson City, in the county of Washington and State of Tennessee, have invented a new and useful Improvement in Saw-Gummers, which improvement is fully set forth in the following specification.

The first part of my invention consists in the combination of an annular clamp-plate provided with a screw-thread and hand-wheel, and adapted, when screwed down, to gripe the saw-plate down on the bed-die; a rigid frame having a cavity therein to receive a saw-plate; a punching-die made round for circular saws, diamond-shaped for vertical saws, or of any other required form, and of such size as the saws to be operated on may require, and working within the hollow screw-threaded clamp, and an annular bed-die having an aperture therein corresponding to the form of the punching-die.

My invention consists, further, in the combination, with the aforesaid punching-die, annular clamp, and bed-die, of a lateral slide inserted horizontally in the bed-plate and traversing the aperture in the bed-die, said slide supporting the latter under the blow of the punch, and being withdrawn to release the punchings.

In order that the invention may be more fully understood, I will proceed to describe it with reference to the accompanying drawings, in which—

Figure 1 is a front view of the machine. Fig. 2 is a vertical longitudinal section on the line 2 2. Fig. 3 is a horizontal section on the line 3 3.

A is a bed-plate supporting a rigid die-frame, B, in which is a cavity, C, to receive a saw-plate of any kind for which the machine may be used. Within the frame B is an annular bed-die, D, the aperture in which corresponds in form with the punching-die E, the shape thereof being varied according to the kind of saw to be operated on. The concave-faced die E acts shearwise within the die D, so as to make a clean cut.

The punching-die E is guided by a hollow screw, F, within which it works, said screw having a hand-wheel, G, at top to turn it, and carrying at bottom an annular clamp-plate, H, adapted when screwed down to gripe the saw-plate tightly down on the bed-die D, so as to avoid the danger of cracking or springing the saw. The punching and bed dies are removable and interchangeable at will for others of different shape or size.

I is a horizontal slide inserted laterally in the die-frame B, and passing completely through or under the bed-die D, so as to sustain the latter under the stroke of the punching-die. This slide is withdrawn to discharge the punchings. This slide extends across the bed and covers the opening therein, thus allowing dies of any size or shape being used in the same machine, as the whole under surface of the die will be fully supported by the slide at all times, whatever its shape or size, and whatever the size of the opening in the bed.

J is a mandrel to receive the eye of a circular saw. The said mandrel is fixed at any required distance from the dies D E by means of a clamp-nut, K, on the screw-shank L of the mandrel, the said screw-shank being adjustable in a slot, M, radial to the dies.

P P are posts screwed into the bed-plates so as to be adjustable, and serving to level and steady the saw on either side of the mandrel J.

The punching-die E may be actuated by a drop, an eccentric or cam lever, a screw, or any other common appliance for the purpose, or by the stroke of a hammer.

In the present illustration I have shown a drop, N, guided by vertical rods O O, secured to a supporting-frame, W, in which is mounted a windlass, Q, and pulley R for the cord S, by which the drop N is raised, the hook T being arranged to be automatically detached to release the weight when it reaches the upward limit of its movement. A pawl, U, and ratchet-wheel V are provided to sustain the weight when desired.

My improved machine will gum circular, up-and-down, or crosscut saws with great ease and in the best manner, leaving the saw so smooth that but little filing will be required, thus saving much time and labor.

Having thus described my invention, the following is what I claim as new therein and desire to secure by Letters Patent:

1. The combination, as described, of the clamp H, provided with the screw-thread F and hand-wheel G, the arm B, the punching-die E, and the bed-die D, as and for the purpose set forth.

2. The combination of the punching-die E, annular clamp H, bed-die D, and slide I, as and for the purposes set forth.

SILAS H. STEPP.

Witnesses:
T. A. FAWS,
D. J. DEVAULT.